US012302873B2

(12) United States Patent
Eastoe

(10) Patent No.: US 12,302,873 B2
(45) Date of Patent: May 20, 2025

(54) FARMING SYSTEM FOR USE IN AQUACULTURE

(71) Applicant: SIEMENS ENERGY AS, Oslo (NO)

(72) Inventor: Andrew Robert Eastoe, Urangsvåg (NO)

(73) Assignee: SIEMENS ENERGY AS, Oslo (NO)

( * ) Notice: Subject to any disclaimer, the term of this patent is extended or adjusted under 35 U.S.C. 154(b) by 0 days.

(21) Appl. No.: 18/416,040

(22) Filed: Jan. 18, 2024

(65) Prior Publication Data
US 2024/0268359 A1    Aug. 15, 2024

(30) Foreign Application Priority Data

Feb. 10, 2023 (GB) .................................. 2301914

(51) Int. Cl.
A01K 61/60 (2017.01)
A01K 61/10 (2017.01)

(52) U.S. Cl.
CPC .............. A01K 61/60 (2017.01); A01K 61/10 (2017.01)

(58) Field of Classification Search
None
See application file for complete search history.

(56) References Cited

U.S. PATENT DOCUMENTS

| | | | | |
|---|---|---|---|---|
| 4,495,891 A * | 1/1985 | Dugan | ................... | A01K 61/00 119/2 |
| 4,892,059 A * | 1/1990 | Yoneyama | ............. | A01K 61/00 119/3 |
| 2016/0100560 A1 * | 4/2016 | Dornbierer | ............ | A01K 61/00 |
| 2020/0344982 A1 * | 11/2020 | Nagata | ................... | A01K 61/10 |
| 2021/0262877 A1 | 8/2021 | Hansen | | |

FOREIGN PATENT DOCUMENTS

| | | |
|---|---|---|
| CN | 109663767 A | 4/2019 |
| CN | 111053056 A | 4/2020 |
| CN | 112273285 A | 1/2021 |
| CN | 116076414 A | 5/2023 |
| KR | 20110046998 A | 5/2011 |

OTHER PUBLICATIONS

Search Report dated Jul. 25, 2023 corresponding to GB Application 2301914.4 filed Feb. 10, 2023.

* cited by examiner

Primary Examiner — Joshua J Michener
Assistant Examiner — Henry Hooper Mudd

(57) ABSTRACT

A farming system includes a farming cell having an outer wall frame that defines an outer surface. A barrier is coupled to the outer wall frame to define an outer wall. The barrier includes a first roller coupled to the outer wall frame for rotation about a first axis and positioned adjacent to a first edge of the outer wall frame. A second roller is coupled to the outer wall frame for rotation about a second axis that is parallel to the first axis, the second roller positioned adjacent a second edge of the outer wall frame. A continuous net is positioned around the first roller and the second roller to define a first net wall and a second net wall that each cover the outer surface to close the outer wall. A scrubber is coupled to the second net wall and a drive system is operable to rotate the first roller about the first axis to move the second net wall with respect to the scrubber.

20 Claims, 4 Drawing Sheets

FARMING SYSTEM FOR USE IN AQUACULTURE

BACKGROUND

Aquaculture is a growing business in which fish or other products are grown in a large body of water such as an ocean or lake. Many of these aquaculture systems are positioned in deep-sea areas such as the North Sea or the Atlantic Ocean where weather, tides, and animals can be a concern. Fish or other product can escape from aquaculture farms due to damage caused by weather or these other sources. As an example, approximately seventy-five percent of all fish escapes from fish farms are related to holes or tears in the containment nets. Increasing the integrity of these subsurface nets has always been a challenge.

Fish escapes may lead to high financial losses and a potential mixing of farmed fish or product with the natural wild stocks. This mixing can introduce disease and genetic problems to the natural wild stocks. It is expected that future aquaculture will include larger farms and may be positioned further out to sea, with these fish farms holding more product and being exposed to harsher conditions, product escape events will only grow and be scrutinized more closely.

Many systems employ manual inspection either by a diver or a remote operated vehicle (ROV) and camera along with manual net cleaning operations. This type of inspection for holes or tears in nets does not provide for constant monitoring and allows for a hole, damage, or debris in the net to be undiscovered for a period of time.

BRIEF SUMMARY

In one aspect, a farming system for use in water-based farming of a product includes a structural frame arranged to define a farming cell having an outer wall frame that defines an outer surface. A barrier is coupled to the outer wall frame to define an outer wall. The barrier includes a first roller coupled to the outer wall frame for rotation about a first axis, the first roller positioned adjacent to a first edge of the outer wall frame. A second roller is coupled to the outer wall frame for rotation about a second axis that is parallel to the first axis, the second roller positioned adjacent to a second edge of the outer wall frame, the second edge opposite the first edge. A continuous net is positioned around the first roller and the second roller to define a first net wall and a second net wall that each cover the outer surface to close the outer wall. The farming system also includes a scrubber coupled to the second net wall and a drive system operable to rotate the first roller about the first axis to produce movement of the second net wall with respect to the scrubber.

The farming system may also position the first roller completely above a waterline and the first axis parallel to the waterline.

The farming system may also include a net integrity sensor positioned to detect a condition of the continuous net when the continuous net passes above the waterline.

The farming system may also include a net integrity sensor that includes a camera and a controller that is operable to autonomously detect a damaged portion of the continuous net and in response to the detection of the damaged portion activate an alarm.

The farming system may also separate the first roller and the second roller by a first distance, and one of the first roller and the second roller is movable in a direction normal to the first axis to vary the first distance.

The farming system may also include a sensor coupled to the continuous net and operable to measure a tension level of the continuous net, and where the first distance is varied in response to the measured tension level. Other technical features may be readily apparent to one skilled in the art from the following figures, descriptions, and claims.

The farming system may employ a scrubber that includes an inner member disposed between the first net wall and the second net wall and an outer member disposed outside of the second net wall.

The farming system may also include an outer member that includes a resilient portion arranged to engage and scrub the second net wall as the second net wall moves with respect to the outer member.

The farming system may also include a drive system that includes a motor disposed within the first roller.

In one aspect, a method of enclosing a farming cell for use in water-based farming of a product, the method includes connecting a first roller to an outer wall frame, connecting a second roller to the outer wall frame, the second roller and the first roller positioned on opposite sides of the outer wall frame, extending a continuous net around the first roller and the second roller to define a first net wall and a second net wall, the first roller, the second roller, and the continuous net cooperating to define a barrier, positioning the barrier adjacent the outer wall frame to close an outer surface of the farming cell, positioning a scrubber adjacent the second net wall, rotating the first roller to move the second net wall past the scrubber to clean the surface of the second net wall.

The method of enclosing a farming cell may also position the first roller completely above a waterline and the first axis parallel to the waterline.

The method of enclosing a farming cell may also include detecting a condition of the continuous net when the continuous net passes above the waterline using a net integrity sensor.

The method of enclosing a farming cell may also include a net integrity sensor that includes a camera and a controller, and where the detecting step includes autonomously detecting a damaged portion of the continuous net and activating an alarm in response to the detection of the damaged portion.

The method of enclosing a farming cell may also include moving one of the first roller and the second roller along a direction that is normal to the first axis to vary a first distance between the first roller and the second roller.

The method of enclosing a farming cell may also include measuring a tension level of the continuous net using a sensor coupled to the continuous net and varying the first distance in response to the tension level.

The method of enclosing a farming cell may also include a scrubber that includes an inner member disposed between the first net wall and the second net wall and an outer member disposed outside of the second net wall.

The method of enclosing a farming cell may also include moving one of the inner member and the outer member between a non-scrubbing position in which the inner member and the outer member are spaced apart from the second net wall and a scrubbing position in which the inner member and the outer member are in contact with the second net wall.

The method of enclosing a farming cell may also include an outer member that includes a resilient portion arranged to engage and scrub the second net wall as the second net wall moves with respect to the outer member.

The method of enclosing a farming cell may also include operating a motor disposed within the first roller to rotate the first roller about the first axis.

Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
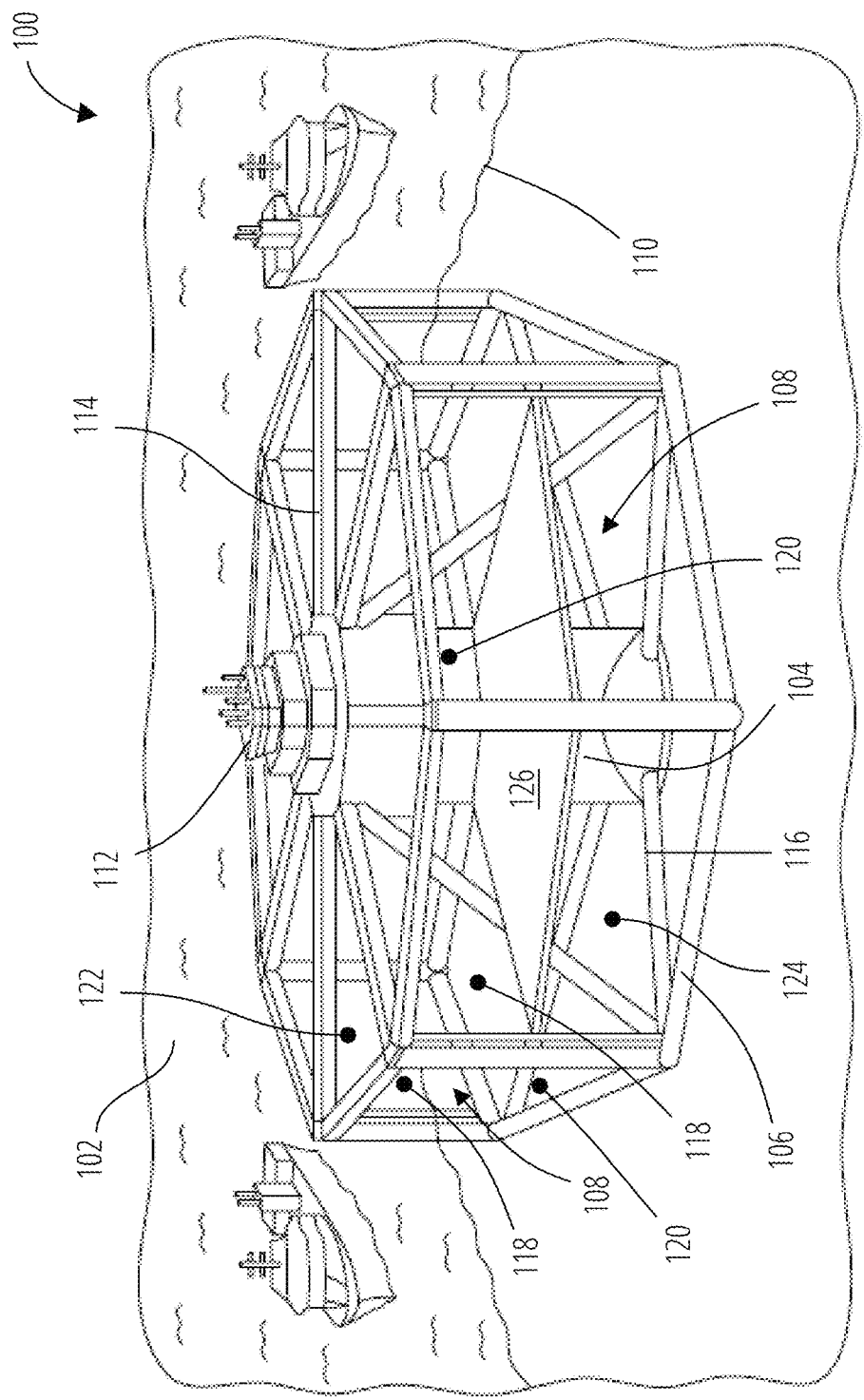
FIG. 1 is a perspective view of an aquaculture farming system including a plurality of farming cells.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting. Furthermore, while multiple embodiments or constructions may be described herein, any features, methods, steps, components, and the like described with regard to one embodiment are equally applicable to other embodiments absent a specific statement to the contrary.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

While terms such as "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion, unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

FIG. 1 illustrates a farming system 100 suitable for use to raise or farm products in a body of water 102 such as an ocean or lake. The farming system 100 of FIG. 1 is particularly suited to raising fish in a large body of water such as the North Sea or the Atlantic Ocean. Of course, other products such as shellfish, or plant-based products could also be farmed in the farming system 100 of FIG. 1. In addition, while the farming system 100 is well-suited for the particular environment offshore, it could also be employed in smaller bodies of water or near the shore (e.g., in a bay or other confined body).

The farming system 100 includes a central hub 104 and a structural frame 106 that are arranged to define a plurality of farming cells 108. The central hub 104 is a cylindrical member having a central axis that extends vertically. The central hub 104 is arranged such that a portion extends above a waterline 110. In the illustrated construction, a control room 112 or other space is positioned on top of the central hub 104 to provide space for workers, operators, and the like.

The structural frame 106 is formed from various structural members that are arranged to define a perimeter for each of the farming cells 108. In the illustrated construction, the structural frame 106 includes a plurality of upper spokes 114 and a plurality of lower spokes 116 with each upper spoke 114 and lower spoke 116 extending radially outward from the central hub 104. The upper spokes 114 and lower spokes 116 cooperate with the remainder of the structural frame 106 to define eight substantially identical farming cells 108. Each of the farming cells 108 is wedge-shaped with a narrow end near the central hub 104 and a wide end at the radially outermost portion of the farming cell 108. This arrangement produces two rectangular side walls 118, a rectangular end wall 120, a trapezoidal or wedge-shaped top wall 122 and a similarly shaped bottom wall 124 for each of the farming cells 108. The central hub 104 forms a narrow end wall 120 for each farming cell 108 near the narrow end. Of course, other arrangements of the farming system 100 and/or each of the farming cells 108 could be employed. For example, cubic farming cells could be employed or more or fewer farming cells could be formed as desired.

In the illustrated construction, one or more of the farming cells 108 may be provided with a movable wall 126. The movable wall 126 can be positioned at some intermediate position within the farming cell 108 to divide the farming cell 108. In addition, the movable wall 126 could be movable to herd the product into a particular space or location for removal, harvesting, or other purposes.

The central hub 104, structural frame 106, and any other components that form the farming system 100 are selected to provide sufficient buoyancy to assure that a portion of the farming system 100 remains above the waterline 110 at all times. The farming system 100 may be anchored or moored in a desired position or may include a drive and steering system that allows an operator to maintain the farming system 100 in a desired position or to move the farming system 100 as may be required.

As illustrated in FIG. 1, the structural frame 106 is arranged to define the perimeter of various walls that cooperate to define each farming cell 108. However, in order to farm product, and in particular fish, each of the walls, with the possible exception of the top wall 122 must be substantially enclosed to adequately contain the product being farmed. The term substantially enclosed means that the walls may include openings that are small enough to inhibit the unwanted escape of the product while also allowing for the passage of water, nutrients, and small items.

Figure 2:
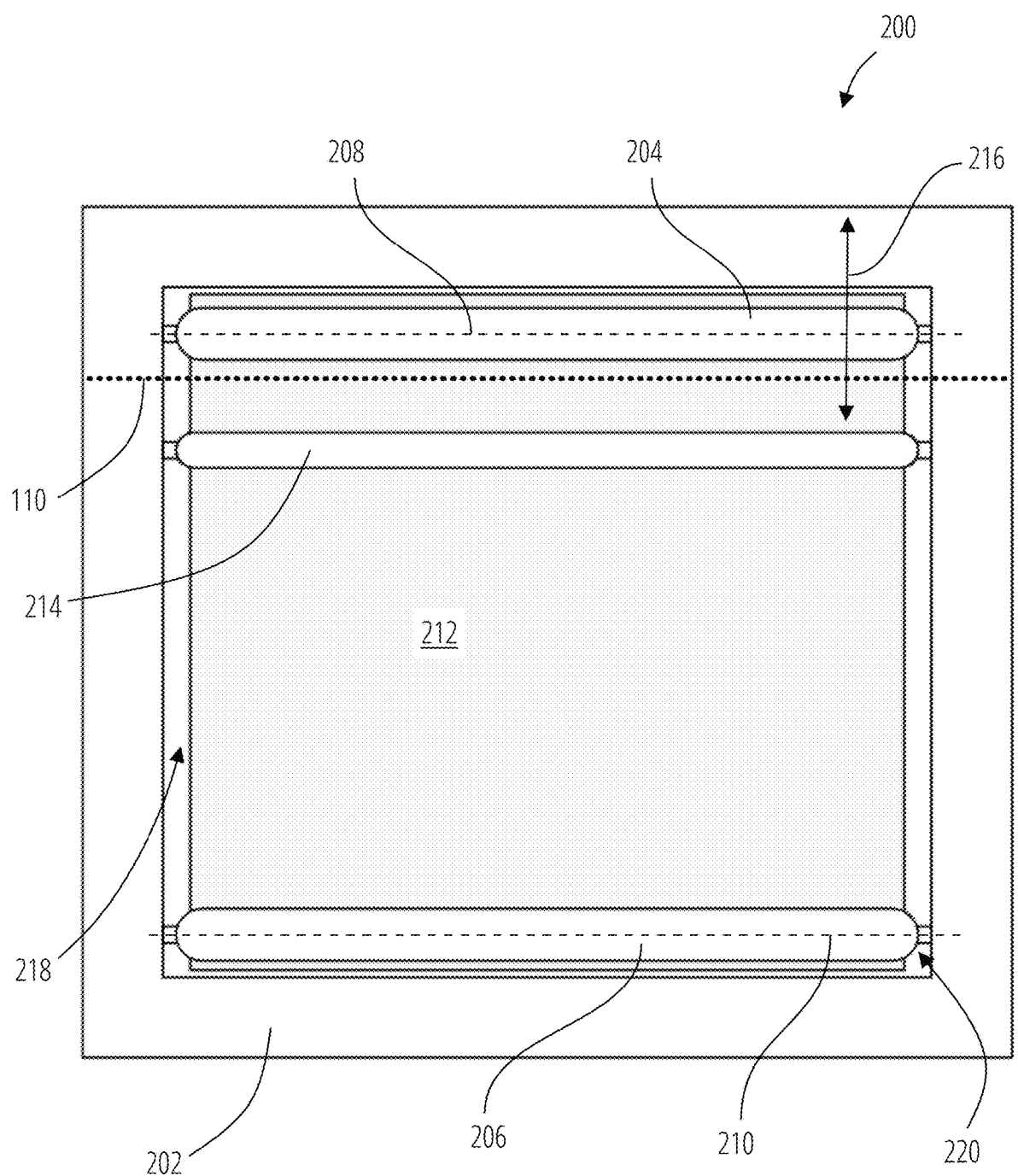
FIG. 2 is a schematic illustration of an end wall or outer wall of a farming cell of the farming system of FIG. 1 including a barrier.

FIG. 2 schematically illustrates an end wall 120 of one of the farming cells 108. The illustrated end wall 120 is an outer wall 200 of the farming cell 108 such that one side of the outer wall 200 is exposed to the interior of the farming cell 108 and the other side of the outer wall 200 is exposed to the open body of water in which the farming system 100 is disposed.

The outer wall 200 is partially formed from the structural frame 106 which includes an outer wall frame 202 that surrounds an outer surface 218. The outer surface 218 is substantially covered or closed by a barrier 220 which inhibits the unwanted escape of product from the farming cell 108 into the open water. As used here, "substantially" means that the barrier 220 is sized to eliminate gaps that are large enough for the escape of the product being farmed. For large fish, relatively large gaps may be present between the outer wall frame 202 and the barrier 220 while still deeming the outer surface 218 covered or closed.

The barrier 220 includes a first roller 204, a second roller 206, a continuous net 212, and a scrubber 214. The continuous net 212 is formed in a manner that allows for the passage of water, small creatures, and other nutrients or food sources but that inhibits the passage of the product being farmed within the farming cell 108. The continuous net 212 can be formed using any suitable material including nylon, metal, rope, cable, and other materials or combinations thereof. The continuous net 212 is arranged in an oval shape including a first net wall 304, a second net wall 306, a first semi-circular surface 308, and a second semi-circular surface 310 best illustrated in FIG. 3, with FIG. 2 illustrating only the first net wall 304.

The first roller 204 is an elongated cylindrical roller supported by the outer wall frame 202 for rotation about a first axis 208. In the illustrated construction, the first axis 208 is substantially parallel to the waterline 110 and is positioned above the waterline 110 to position some or all the first roller 204 above the waterline 110. The diameter and length of the first roller 204 are selected to provide the desired space between the two planar surfaces of the continuous net 212 and to assure the desired support for the continuous net 212 across the width of the outer surface 218. The construction of the continuous net 212 may be such that a minimum or maximum diameter is needed to assure that the continuous net 212 forms the first semi-circular surface 308 and engages the first roller 204.

The first roller 204 may be formed from a single material (e.g., aluminum, steel, etc.) or may be formed from multiple materials. For example, one construction includes a metallic core, that is coated or sealed to inhibit contact with the environment and then is covered with a more resilient or high-friction outer layer that facilitates engagement with the continuous net 212 and assures smooth movement while minimizing slippage and wear of the continuous net 212 or the first roller 204.

The second roller 206 is an elongated cylindrical roller similar to the first roller 204 and supported by the outer wall frame 202 for rotation about a second axis 210. In the illustrated construction, the second axis 210 is substantially parallel to the first axis 208 and is positioned at the opposite end of the outer surface 218 when compared to the first axis 208. Positioning the first axis 208 adjacent one end of the outer surface 218 and the second axis 210 adjacent the second end of the outer surface 218 assures that the desired coverage of the outer surface 218 is achieved.

The continuous net 212 extends around the second roller 206 to form the second semi-circular surface 310. As with the first roller 204, the size and materials used for the second roller 206 are selected to achieve the desired support of the continuous net 212 and to provide the desired level of engagement between the second roller 206 and the continuous net 212.

In order to maintain a desired tension level one or both of the first roller 204 and the second roller 206 are movable along a tension axis 216. Thus, in order to increase the tension applied to the continuous net 212, the first roller 204 and/or the second roller 206 are moved away from one another along the tension axis 216. The opposite movement produces a reduction in the tension level. In preferred constructions, the first roller 204 is the only roller that moves along the tension axis 216. The position of the first roller 204 above the waterline 110 makes installation, inspection, and maintenance of the moving mechanism easier.

Figure 3:
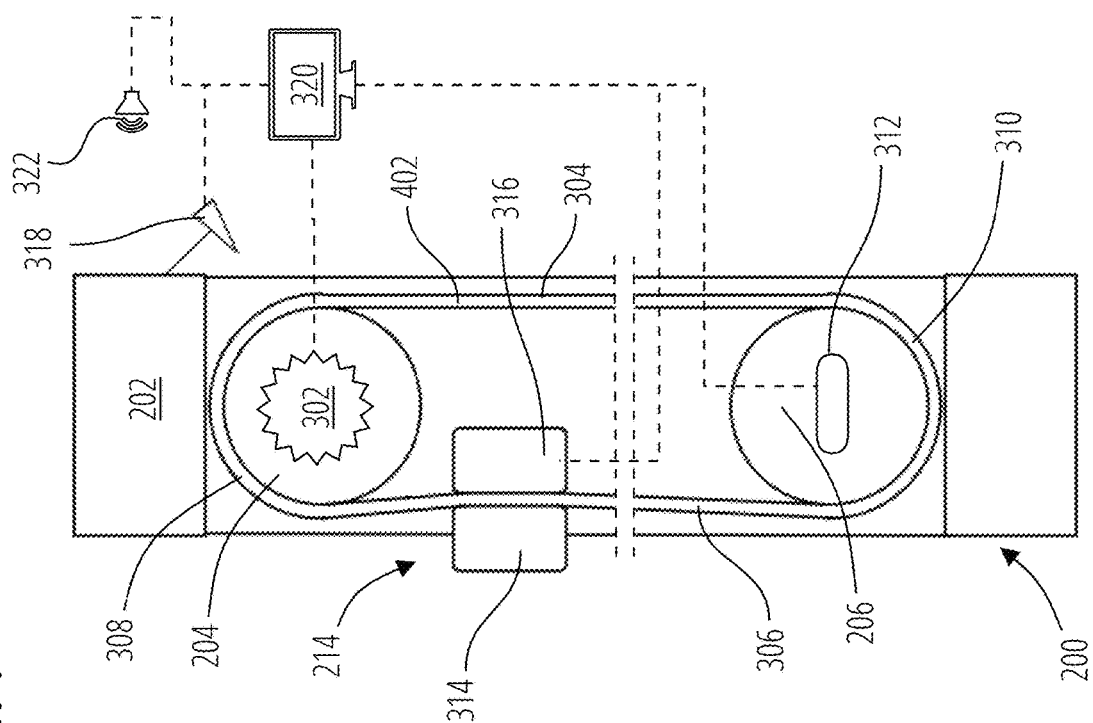
FIG. 3 is a schematic side view of the outer wall and barrier of FIG. 2 including a scrubber in a non-scrubbing position.
Figure 4:
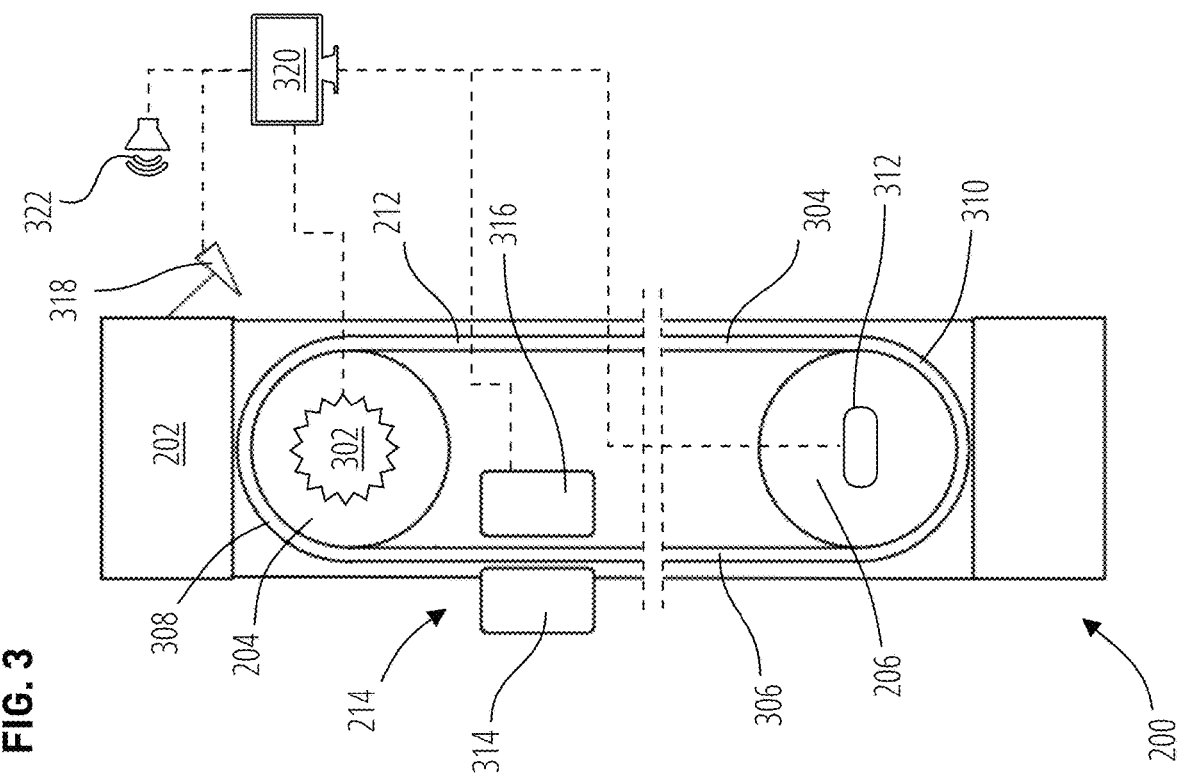
FIG. 4 is a schematic side view of the outer wall and barrier of FIG. 2 including the scrubber in a scrubbing position.

The scrubber 214, better illustrated in FIG. 3 and FIG. 4 is positioned between the first roller 204 and the second roller 206. In most arrangements, the scrubber 214 is positioned fully below the waterline 110. However, other arrangements may position the scrubber 214 above or at the waterline 110 as may be desired.

FIG. 3 is a side view of the outer wall 200 illustrated in FIG. 2. As is better illustrated in FIG. 2, the first roller 204 includes a motor 302 arranged to rotate the first roller 204. In the illustrated construction, the first roller 204 includes a hollow portion and the motor 302 is disposed within that hollow portion. In other constructions, the motor 302 is disposed outside of the first roller 204 and either directly drives the first roller 204 or drives the first roller 204 indirectly (e.g., belt drive, gear drive, etc.).

The motor 302 is connected to a computer or controller 320 that may receive operating information from the motor 302 and that sends control signals to the motor 302. The motor 302 may be any type of motor desired including but not limited to a variable speed motor where the controller 320 operates as a variable speed drive or controls a separate variable speed drive for the motor 302.

The second roller 206 includes a sensor 312 that is operable to measure a tension in the continuous net 212. The sensor 312 could include a load cell or cells that measure the forces on the second roller 206 to determine the tension level of the continuous net 212. The sensor 312 sends signals indicative of the measured values to the controller 320. The controller 320 operates to analyze the measured values from the sensor 312 and calculate a tension level for the continuous net 212. This value can also be displayed by the controller 320 if desired. In addition, the controller 320 is operable to move one or both of the first roller 204 and the second roller 206 along the tension axis 216 to adjust the tension level to assure that the tension level remains within the desired tension range. While the illustrated construction shows the sensor 312 connected to the second roller 206, other constructions may couple the sensor 312 to the first roller 204 or to both rollers as may be desired. In addition, other sensors or methods of determining the tension level of the continuous net 212 may be suitable for use.

A net integrity sensor 318, in the form of a camera or imaging device is positioned near the first roller 204 to allow for the viewing of the continuous net 212 as the continuous net 212 passes over the first roller 204. The net integrity sensor 318 is coupled to the controller 320 or other system that interprets the images to determine the integrity of the continuous net 212.

In one construction, the controller 320 includes an AI-based computer program that is able to analyze the integrity of the continuous net 212 and trigger an alarm 322 if damage to the continuous net 212 is detected. The alarm 322 could include an audible alarm 322, a visual alarm 322, or any other suitable alarm 322 or communication that may be desired.

The scrubber 214 includes an outer member 314 and an inner member 316 that are illustrated in a non-scrubbing position in FIG. 3. In the non-scrubbing position, one or both of the outer member 314 and the inner member 316 are spaced apart from the second net wall 306. The outer member 314 is positioned outside of the continuous net 212 and specifically, outside of the second net wall 306. The inner member 316 is disposed between the first net wall 304 and the second net wall 306.

FIG. 4 illustrates the same components illustrated in FIG. 3 but with the scrubber 214 in a scrubbing position. In the scrubbing position, one or both of the outer member 314 and the inner member 316 move toward one another and into contact with the second net wall 306. In one arrangement, the inner member 316 is a roller that rolls on the second net wall 306 as the second net wall 306 moves past the scrubber 214. In this arrangement, the inner member 316' functions simply as backing or a support surface for the second net wall 306 to resist movement that results from contact between the outer member 314 and the second net wall 306. The outer member 314 engages the second net wall 306 and scrubs or removes debris from the second net wall 306. With this arrangement, only the outer surface of the second net wall 306 is scrubbed which assures that any removed debris drops harmlessly outside of the farming cell 108. In other constructions, the inner member 316 is a scrubbing member rather than a roller. In these arrangements, the inner member 316 is similar in construction to the outer member 314 and both the outer member 314 and the inner member 316 perform a cleaning operation.

To facilitate the cleaning, the surface of the outer member 314 includes a material suitable for cleaning the particular material used to form the continuous net 212. In one construction, the outer member 314 may include a resilient material such as rubber, wire mesh, and the like which is suitable for cleaning the continuous net 212 without causing damage or wear. The inner member 316, if in the form of a roller may be made of similar materials as the first roller 204. If the inner member 316 also performs a cleaning operation, it would be made of materials similar to those used for the outer member 314.

Figure 5:
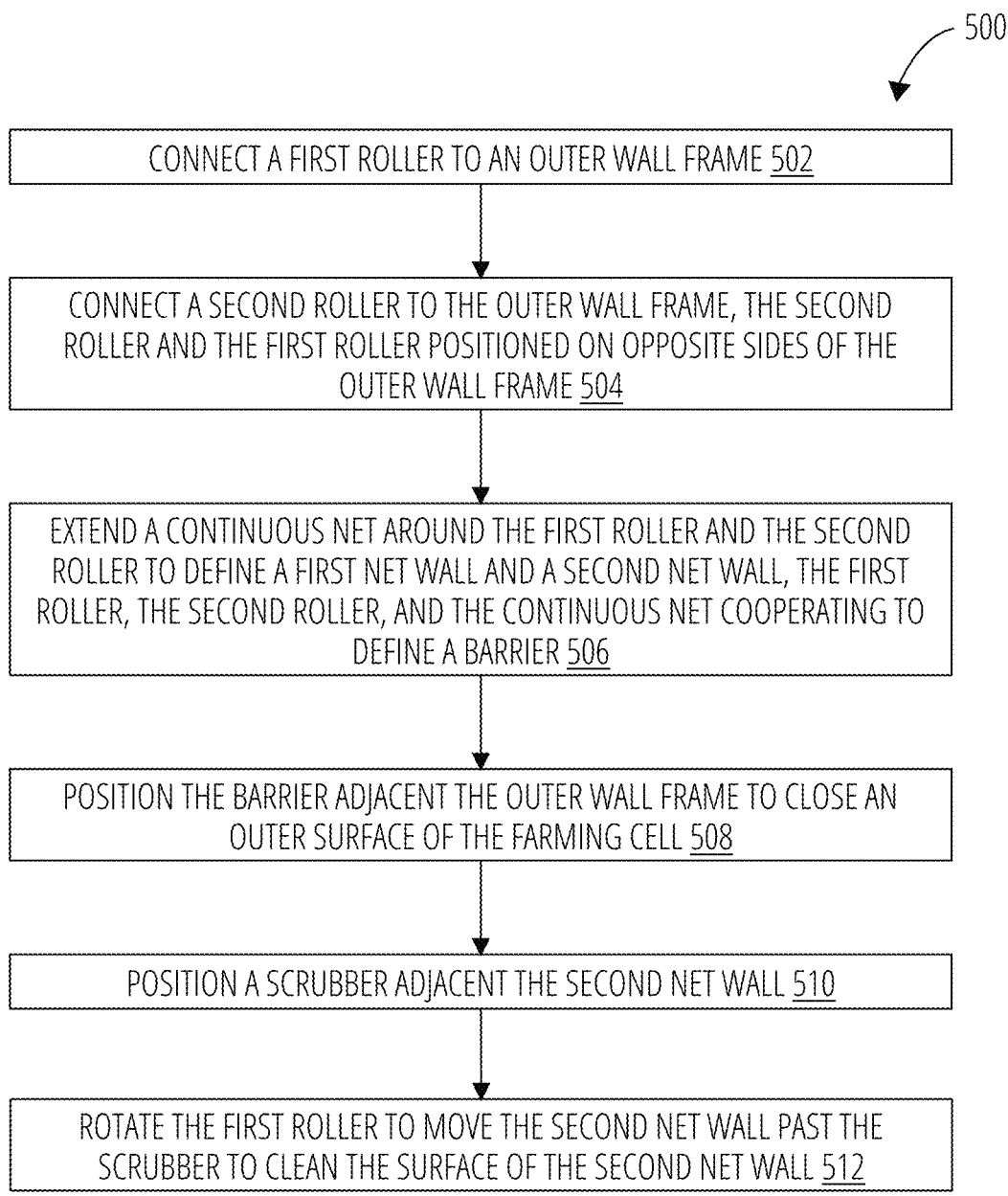
FIG. 5 is a flow chart illustrating one arrangement of the barrier of FIG. 2.

FIG. 5 illustrates the assembly and operation of the outer wall 200 illustrated in FIGS. 2-4. In a first step, the first roller 204 is connected to an outer wall frame 202 (block 502). Similarly, the second roller 206 is connected to the outer wall frame 202 with the second roller 206 and the first roller 204 positioned on opposite sides of the outer wall frame 202 (block 504). The continuous net 212 is positioned around the first roller 204 and the second roller 206 to define the first net wall 304 and the second net wall 306, the first roller 204, the second roller 206, and the continuous net 212 cooperating to define a barrier 220 (block 506). The barrier 220 is positioned adjacent the outer wall frame 202 to close an outer surface 218 of the farming cell 108 (block 508). A scrubber 214 is positioned adjacent the second net wall (block 510) and the first roller 204 is rotated to move the second net wall 306 past the scrubber 214 to clean the surface of the second net wall (block 512).

The controller 320 includes a micro-processer or other computer controller that can receive inputs including signals from each of the motors 302 and/or sensors 312 as well as other motors or sensors and produce outputs such as control signals that control the operation of the motor 302, the scrubber 214, and the tensioning mechanism that operates to maintain the tension of the continuous net 212. Suitable controllers 320 include large scale controllers such as SCADA systems, computer controllers, PC-based controllers, programmable logic controllers (PLC), and the like. While the controller 320 is described as a single component, multiple devices could be employed together to perform the functions of the controller 320. Thus, the controller 320 encompasses all of the devices used to perform the various functions attributed to the controller 320 or a computer. In addition, non-computer-based controllers could be employed as desired.

The farming system 100 illustrated and described herein is specifically applicable to large scale offshore aquaculture farms with the farming system 100 designed to be much more robust and able to cope with the large wave heights and high winds seen during a typical North Atlantic winter.

In operation, the barrier 220 is coupled to the outer wall frame 202 to cover the outer surface 218. The continuous net 212 is arranged around the first roller 204 and the second roller 206 to define the first net wall 304, second net wall 306, first semi-circular surface 308, and the second semi-circular surface 310. The sensor 312 measures the tension level of the continuous net 212 and sends that information to the controller 320. The controller 320 determines if the measured tension level falls within a desired operating range and adjusts the tension level if it does not fall within the desired range. As described, the tension is increased by moving the first roller 204 and the second roller 206 away from one another and it is reduced by moving the first roller 204 and the second roller 206 toward one another. In one construction, only the first roller 204 is moved.

The motor 302 is operated either continuously or periodically to rotate the first roller 204 and to move the continuous net 212 around the first roller 204 and the second roller 206. A portion of the continuous net 212 passes over the first roller 204 and moves through the field of view of the net integrity sensor 318. The net integrity sensor 318 captures images of the continuous net 212 or other data and transmits that data to the controller 320 for analysis. A program, such as an AI program analyzes the images and determines if any unacceptable damage exists. If unacceptable damage is detected, the controller 320 can trigger the alarm 322 and perform any additional steps or communication desired.

As the continuous net 212 moves, the scrubber 214 can move between the non-scrubbing position illustrated in FIG. 3 and the scrubbing position illustrated in FIG. 4. To move to the scrubbing position, one or both of the outer member 314 and the inner member 316 move toward one another and contact the second net wall 306. In preferred constructions, only one of the outer member 314 and the inner member 316, and typically the outer member 314 moves to initiate the scrubbing operation. The inner member 316 acts as a support to allow the outer member 314 to apply a desired level of force to the second net wall 306 to achieve the desired level of cleaning. Any debris that is removed falls or floats into the open body of water as the outer member 314 is positioned outside of the farming cell 108. In some constructions, the inner member 316 performs a scrubbing operation rather than just a support function.

The net integrity sensor 318 may also be employed to analyze the continuous net 212 after or during a scrubbing operation to verify that the cleaning of the continuous net 212 is sufficient. In some constructions, the net integrity sensor 318 triggers a scrubbing operation in response to detecting significant debris in the continuous net 212.

It should also be noted that while the construction described herein includes a scrubber 214 that is movable between a scrubbing position and a non-scrubbing position, other constructions may fix the scrubber 214 in a scrubbing position and move the continuous net 212 continuously or only when scrubbing is desired.

The use of the barrier 220 described herein advantageously provides a double wall to prevent the escape of the product being farmed. In addition, the ability to move the continuous net 212 to allow continuous or periodic above the waterline inspections of the net integrity greatly reduces the cost of the inspections as well as the potential time that a defect may go undetected. Furthermore, the ability to scrub or clean the net without the use of divers or remote operated vehicles reduces the cost and difficulty associated with cleaning the nets.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A farming system for use in water-based farming of a product, the farming system comprising:
   a structural frame arranged to define a farming cell having an outer wall frame that defines an outer surface;
   a barrier coupled to the outer wall frame to define an outer wall, the barrier including;
      a first roller coupled to the outer wall frame for rotation about a first axis, the first roller positioned adjacent to a first edge of the outer wall frame;
      a second roller coupled to the outer wall frame for rotation about a second axis that is parallel to the first axis, the second roller positioned adjacent to a second edge of the outer wall frame, the second edge opposite the first edge; and
      a continuous net positioned around the first roller and the second roller, the continuous net defining a first net wall and a second net wall that each cover the outer surface to close the outer wall;
   a scrubber coupled to the second net wall; and
   a drive system operable to rotate the first roller about the first axis to produce movement of the second net wall with respect to the scrubber.

2. The farming system of claim 1, wherein the first roller is positioned completely above a waterline and the first axis is parallel to the waterline.

3. The farming system of claim 2, further comprising a net integrity sensor positioned to detect a condition of the continuous net when the continuous net passes above the waterline.

4. The farming system of claim 3, wherein the net integrity sensor includes a camera and a controller that is operable to autonomously detect a damaged portion of the continuous net and in response to the detection of the damaged portion activate an alarm.

5. The farming system of claim 1, wherein the first roller and the second roller are separated by a first distance, and wherein one of the first roller and the second roller is movable in a direction normal to the first axis to vary the first distance.

6. The farming system of claim 5, further comprising a sensor coupled to the continuous net and operable to measure a tension level of the continuous net, and wherein the first distance is varied in response to the measured tension level.

7. The farming system of claim 1, wherein the scrubber includes an inner member disposed between the first net wall and the second net wall and an outer member disposed outside of the second net wall.

8. The farming system of claim 7, wherein one of the inner member and the outer member is movable between a non-scrubbing position in which the inner member and the outer member are spaced apart from the second net wall and a scrubbing position in which the inner member and the outer member are in contact with the second net wall.

9. The farming system of claim 7, wherein the outer member includes a resilient portion arranged to engage and scrub the second net wall as the second net wall moves with respect to the outer member.

10. The farming system of claim 1, wherein the drive system includes a motor disposed within the first roller.

11. A method of enclosing a farming cell for use in water-based farming of a product, the method comprising:
   connecting a first roller to an outer wall frame;
   connecting a second roller to the outer wall frame, the second roller and the first roller positioned on opposite sides of the outer wall frame;
   extending a continuous net around the first roller and the second roller to define a first net wall and a second net wall, the first roller, the second roller, and the continuous net cooperating to define a barrier;
   positioning the barrier adjacent the outer wall frame to close an outer surface of the farming cell;
   positioning a scrubber adjacent the second net wall;
   rotating the first roller to move the second net wall past the scrubber to clean the surface of the second net wall.

12. The farming system of claim 11, wherein the first roller is positioned completely above a waterline and the first axis is parallel to the waterline.

13. The farming system of claim 12, further comprising detecting a condition of the continuous net when the continuous net passes above the waterline using a net integrity sensor.

14. The farming system of claim 13, wherein the net integrity sensor includes a camera and a controller, and wherein the detecting step includes autonomously detecting a damaged portion of the continuous net and activating an alarm in response to the detection of the damaged portion.

15. The farming system of claim 11, further comprising moving one of the first roller and the second roller along a direction that is normal to the first axis to vary a first distance between the first roller and the second roller.

16. The farming system of claim 15, further comprising measuring a tension level of the continuous net using a sensor coupled to the continuous net, and varying the first distance in response to the tension level.

17. The farming system of claim 11, wherein the scrubber includes an inner member disposed between the first net wall and the second net wall and an outer member disposed outside of the second net wall.

18. The farming system of claim 17, further comprising moving one of the inner member and the outer member between a non-scrubbing position in which the inner member and the outer member are spaced apart from the second net wall and a scrubbing position in which the inner member and the outer member are in contact with the second net wall.

19. The farming system of claim 17, wherein the outer member includes a resilient portion arranged to engage the scrub the second net wall as the second net wall moves with respect to the outer member.

20. The farming system of claim 11, further comprising operating a motor disposed within the first roller to rotate the first roller about the first axis.

* * * * *